United States Patent [19]

Reaux

[11] Patent Number: 4,815,650
[45] Date of Patent: Mar. 28, 1989

[54] HYDRAULICALLY ACTIVATED WELDING FLANGE

[76] Inventor: James Reaux, P.O. Box 503, St. Martinville, La. 70582

[21] Appl. No.: 128,787

[22] Filed: Dec. 4, 1987

[51] Int. Cl.⁴ .............................................. F16L 13/02
[52] U.S. Cl. .................................... 228/119; 228/182; 228/186; 285/31; 285/93; 285/96; 285/101; 285/286
[58] Field of Search ........................ 228/119, 182–184, 228/186, 189, 219; 285/31, 93, 96, 101, 286

[56] References Cited

U.S. PATENT DOCUMENTS

| | | | |
|---|---|---|---|
| 2,831,708 | 4/1958 | Kircher | 285/31 |
| 2,877,628 | 3/1959 | Maunsell | 285/101 |
| 3,097,866 | 7/1963 | Iversen | 285/101 |
| 4,065,846 | 1/1978 | Leonard, Jr. | 228/119 |
| 4,508,129 | 4/1985 | Brown | 228/119 |
| 4,577,488 | 3/1986 | Broadus et al. | 228/103 |
| 4,605,156 | 8/1986 | Stenger et al. | 228/127 |
| 4,693,499 | 9/1987 | Servé | 285/96 |

*Primary Examiner*—Fred A. Silverberg
*Assistant Examiner*—Samuel M. Heinrich
*Attorney, Agent, or Firm*—Pravel, Gambrell, Hewitt, Kimball & Krieger

[57] ABSTRACT

An apparatus for welding a section of pipeline onto an existing pipeline, the process including the steps of cutting away the section of damaged pipeline; providing a apparatus insertable within each end of the existing line for venting off gas within the line to create a gas free safety zone around the cut ends of the line; providing a flange for welding onto the ends of the line, the flange including a ring for sealingly engaging the face of a mating flange to effect an initial seal between the flanges while a weld bead is welded in place between the mating flanges. Following the welding, there is provided a test port in the wall of the flange for allowing air or fluid to be injected into the annular space between the metal sealed ring and the weld so as to test for any leak in the weld in place. Further, the sealing ring and test ports are in a position so that the exterior weld between the flanges may be X-rayed for any flaws within the weld.

13 Claims, 4 Drawing Sheets

HYDRAULICALLY ACTIVATED WELDING FLANGE

BACKGROUND OF THE INVENTION

1. Field of the Invention

The apparatus and method of the present invention relates to securing of flanges onto a pipeline, and more particularly relates to an apparatus and process for assuring that flanges welding to a pipeline due to a break in the pipeline may be secured without leaks and create a safety zone for workers undertaking the welding process.

2. General Background

In pipelines for transporting gas under pressure at great distances, often times a section of the pipeline must be replaced due to a break in the pipeline or other problems confronted. Therefore, the source of the pressurized gas must be shut down, and a section of the pipeline must be replaced. Of course, in replacement, the pipeline must be cut and a new section welded thereupon.

The major problem confronted in this situation, is the existing volume of gas which is retained in the pipeline even after the source of gas has been shut down. Therefore, it is imperative that the volume of gas either be removed from the pipeline, or that a safety zone be created for the welders who must place the section of pipe in the line. The most difficult problem is the removal of the gas from the line, which has been attempted in various methods. One such method may be to attempt to vent the gas from the pipeline, by the use of a "pig" pushed through the line from its source so that it would push the volume of gas from the line. This process is an extremely expensive and time consuming process and has been found to be prohibitively expensive. An additional method is to pump a plug of nitrogen into the open end of the pipeline and literally push the volume of gas away from the end of the line so that the welders may work within this gas free zone. One of the problems in this particular area is the fact that if the nitrogen plug would back out of the line into the areas where the workers are working, the nitrogen would in effect replace any oxygen in the area and the welders would suffocate due to the lack of oxygen. Of course, the most obvious problem in this area, is the fact that if no precautions are taken to care for the safety of the welders, then any spark or the like would result in a catastrophic explosion and fire of the gas within the pipeline.

SUMMARY OF THE PRESENT INVENTION

The apparatus and method of the present invention addresses the problems confronted in a straight forward manner. What is provided is an apparatus for welding a section of pipeline onto an existing pipeline, the process including the steps of cutting away the section of damaged pipeline; providing a means insertable within each end of the existing line for venting off gas within the line, to create a gas free safety zone around the cut ends of the line; providing a flange for welding onto the ends of the lines, the flange including a means for sealingly engaging the face of a mating flange to effect an initial seal between the flanges while a weld bead is welded in place between the mating flanges. This means includes an angular metal ring housed in a collar within the face of the flange, the collar movable through hydraulic pressure to impart movement of the ring to a position for sealingly engaging the face of the adjacent flange. Following the welding, there is provided a test port in the wall of the flange for allowing air or fluid to be injected into the annular space between the metal ring seal and the weld so as to test for any leak in the weld in place. Further, the sealing ring and test ports are in a position so that the exterior weld between the flanges may be X-rayed for any flaws within the weld.

Therefore, it is a principal object of the present invention to provide a method for replacing a section of pipeline of an existing gas line without creating a hazardous area for workers;

It is a further object of the present invention to provide a method for welding a section of pipeline onto ends of an existing pipeline in such a manner that any gas flow from the existing pipeline into the replaced section is prevented from making contact with the welding unit exterior to the pipeline; and It is still a further object of the present invention to provide a method for installing a section of pipeline onto an existing pipeline, so that the welding of the flanges between the pipelines is completed in a safety free zone, and any gas within the pipeline is vented remotely to the atmosphere.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
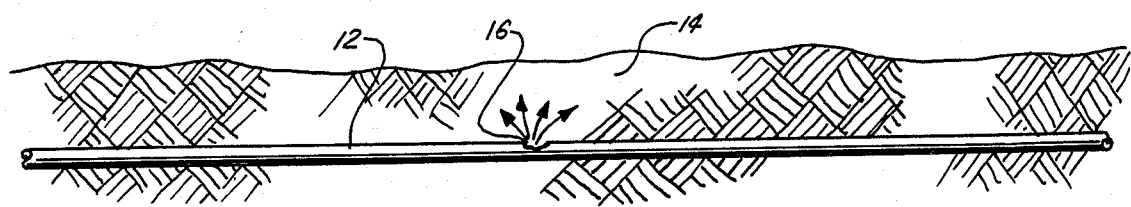
FIG. 1 represents a typical pipeline wherein a rupture is illustrated therein.

FIGS. 1-6 illustrate the preferred embodiment of the apparatus and method of the present invention. As illustrated more particularly in FIG. 1, the present invention would be utilized in relation to a gas pipeline 12 which is utilized to transport natural gas or the like under high pressure across great distances, with the pipeline 12 usually buried beneath a section of earth 14. As illustrated in FIG. 1, for purposes of the use of the present invention, pipeline 12 illustrates a rupture or wear 16 which may be the result of various causes, so that a portion of the pipeline must be replaced in order for the pipeline to function properly.

Figure 2:
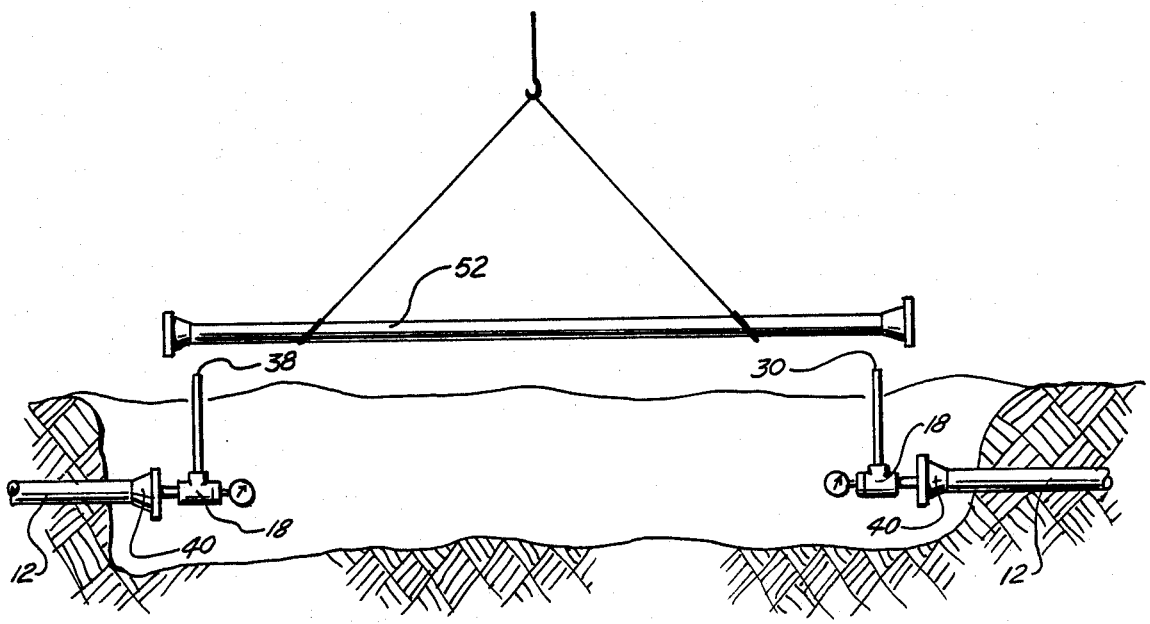
FIG. 2 illustrates the removal of the ruptured section of pipeline while the ends of the existing pipeline are secured by use of the MACSTOPPLE, from residual gas in pipeline.
Figure 3:
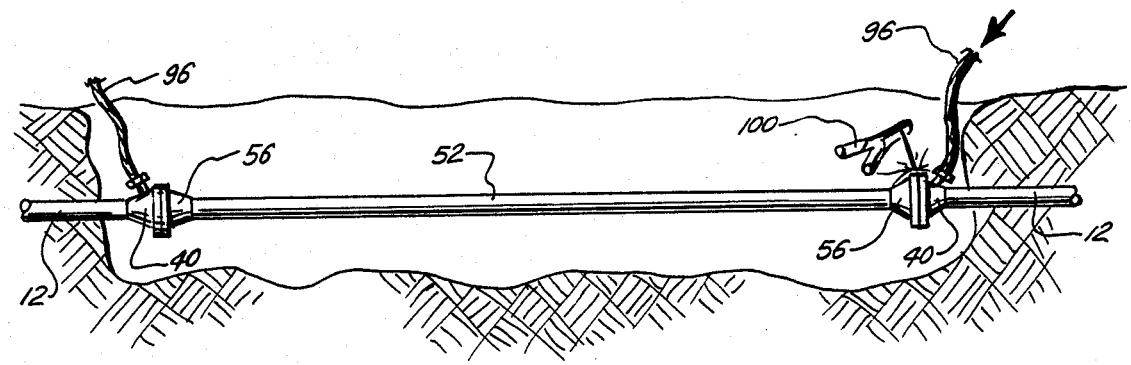
FIG. 3 illustrates the pipeline in place to be welded in place of the existing line.

FIGS. 2 and 3 illustrate the positioning of a replacement section 52 of pipeline 12 following detection of the ruptured or worn section, having undertaken the method and incorporating the apparatus of the present invention into the pipeline, and will be referred to subsequent to a discussion of the invention as will be illustrated in subsequent Figures. However, for purposes of the use of the present invention, the present invention is utilized for a safe replacement of a section of pipeline that has been ruptured, or worn so that no harm is done to the workers who must replace the damaged section.

In order to replace the damaged section, the source of gas flow through the line is discontinued so that the damaged section can be removed from the pipeline. This is done through a "cold" cutting technique, so that the damaged section of pipeline may be cleanly cut away from the pipeline with no resultant sparks or flame which may cause a catastrophic explosion. This "cold cutting technique" is known in the art, and is not part of the present invention.

Figure 4:
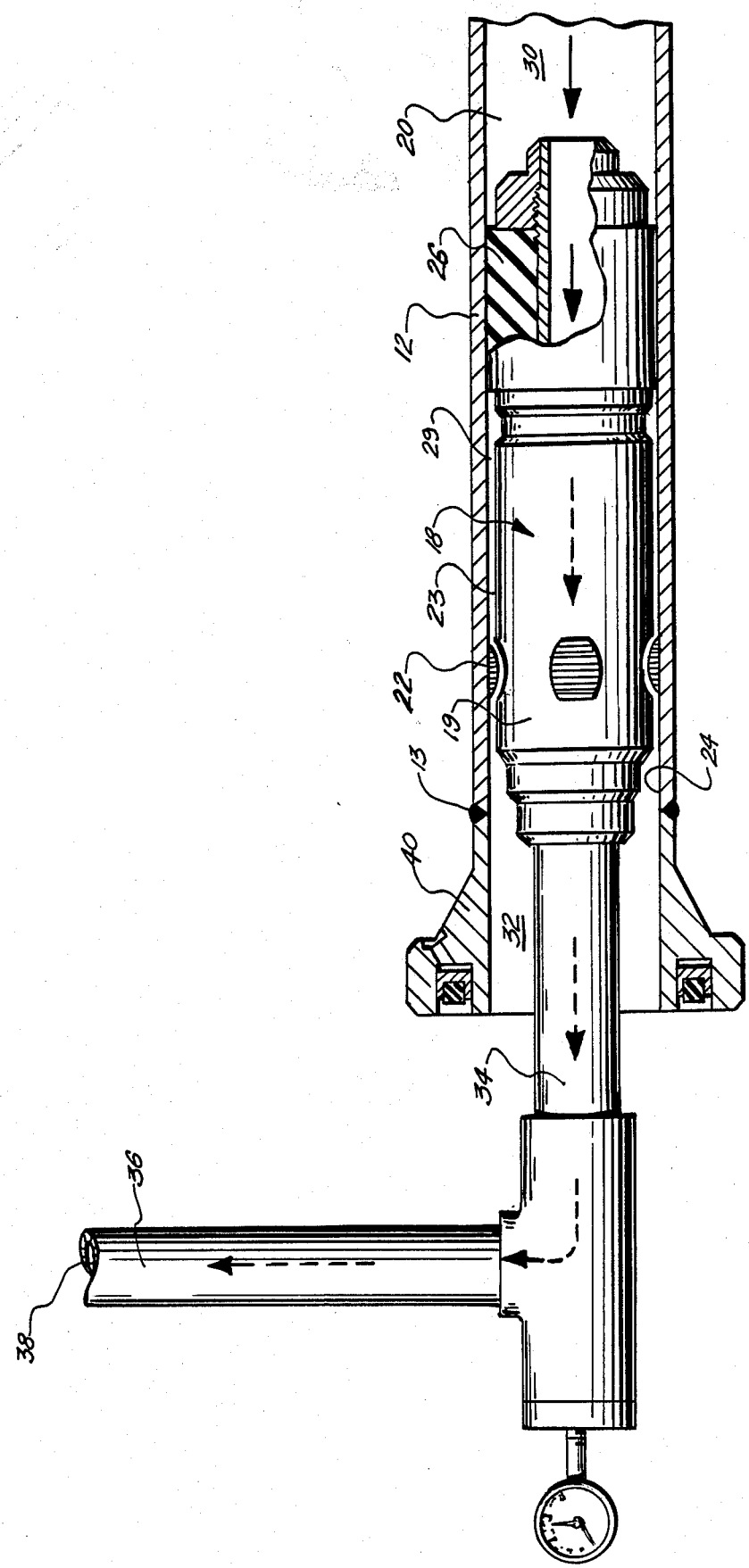
FIG. 4 illustrates a side view of the MACSTOPPLE sealing apparatus in position within the existing pipeline of the present invention.

Following the cutting away of the damaged pipeline, as was referred to earlier, in the process of the present invention a flange 40 is positioned at the end of the pipeline 12 so that it may be safely welded in place. Following positioning of the flange 40, yet prior to undertaking the welding procedure, it is imperative that a means be provided for eliminating residual gas within both sections of pipeline 12 (FIG. 2). Said residual gas to be vented at a distance sufficient from the ends of the pipeline so that the pipeline may be repaired. As seen in FIG. 4, this means of maintaining the gas to be vented a safe distance from the pipeline would comprise a device known in the oil field art as a MACSTOPPLE apparatus 18, which is a patented apparatus usually utilized in downhole applications, and was patented under U.S. Pat. No. 4,658,860. (MACSTOPPLE is a trademark of Macrea Technology for an apparatus for venting residual gas and condensate from pipeline risers). As seen in FIG. 4, generally, the MACSTOPPLE apparatus 18 would include a body portion 19 of a diameter to slidably be accommodated within the bore 20 of pipeline 12. Body portion 19 would further include a plurality of gripping members 22 around its exterior annular wall portion 23 where upon expansion, grip the interior surface 24 of pipe 12, so that MACSTOPPLE 18 is positioned stationary within the bore 20 of pipeline 12. There is further included an expandable bladder member 26, which upon introduction of fluid into the apparatus would expand to fill the annular space 29 between wall 24 of pipeline 12 and apparatus 18, and provide an annular seal around the interior wall 24 of the pipeline so that gas contained in portion 30 to the rear of apparatus 18 is prevented from moving into the forward section 32 of pipeline 12, where welding would be taking place. Further, apparatus 18 is provided with a vent tube 34, which provides an upper extending portion 36 for venting any gas in the pipeline which may be escaping to an exit point 38 which is a sufficient distance away from the forward portion 32 of pipeline 12, so as to negate any possibility of contact between the welding and the flow of natural gas. The next step in the process, would provide for the steps of what is safely securing the welding flange 40 to the end portion 13 of pipeline 12, so that a replacement section 52 of pipeline 12 may be set in place.

Figure 5:
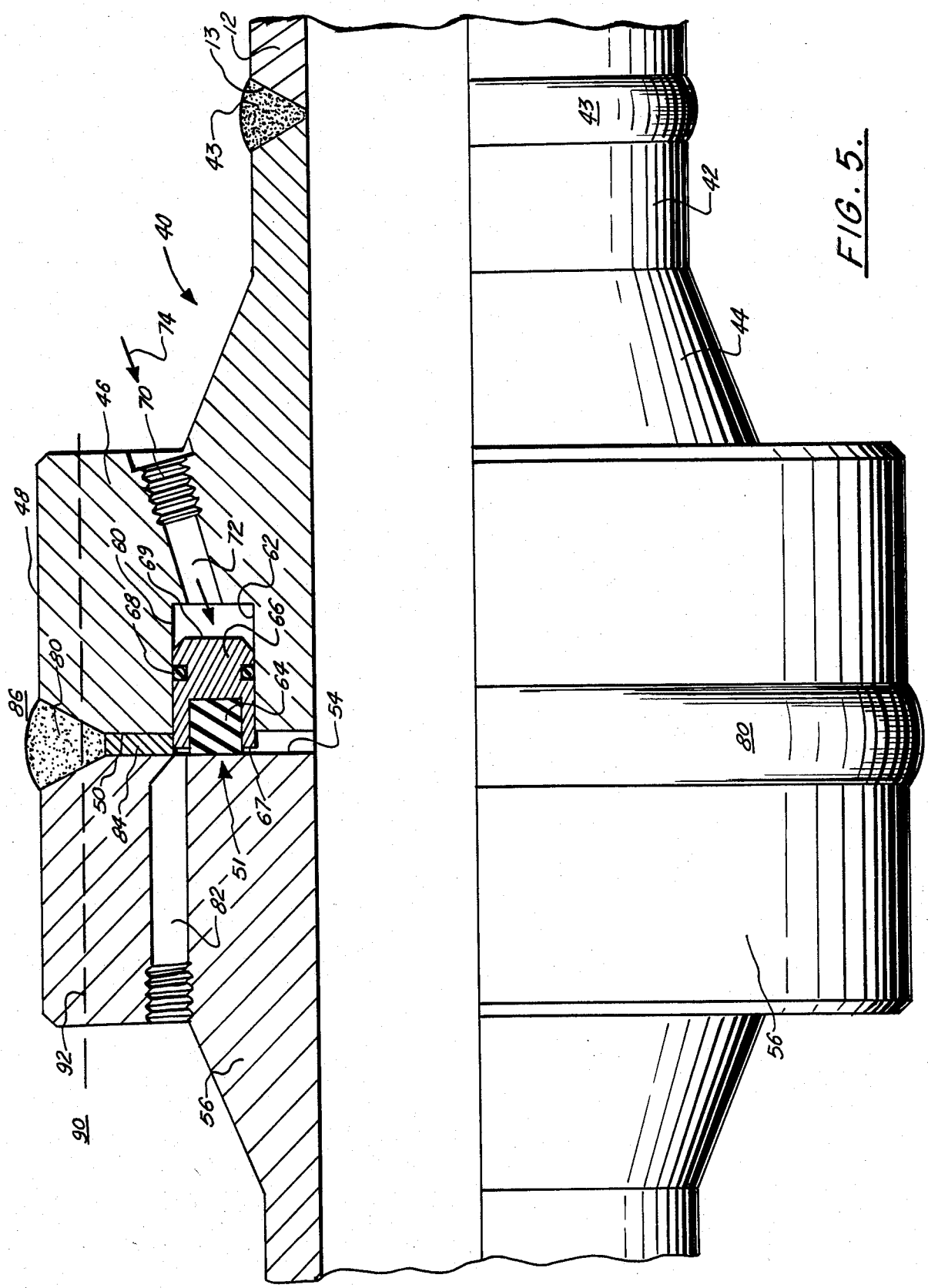
FIG. 5 illustrates a partial cross-sectional view of the welding flange of the present invention in place on the existing pipeline.
Figure 6:
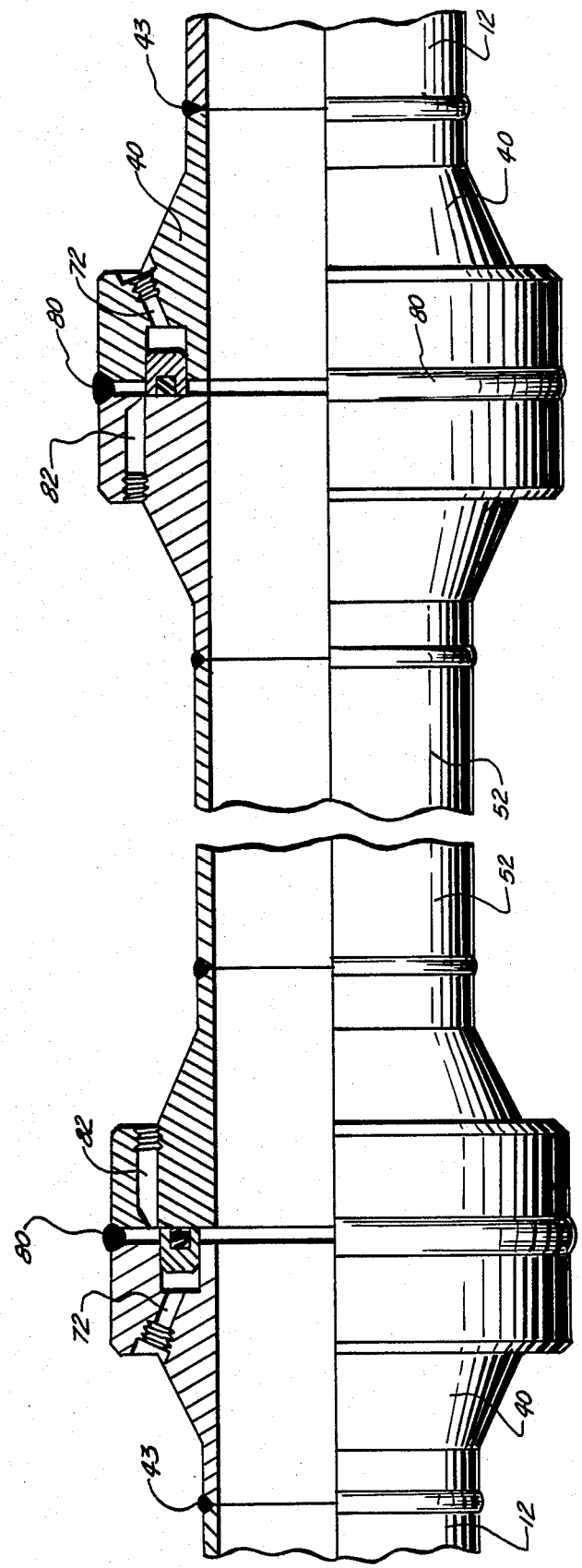
FIG. 6 represents a composite view of the end portions of the existing pipeline welded to the replacement span utilizing the method of the present invention.

FIGS. 5 and 6 provide a detailed illustration of welding flange 40 which is an integral part of the apparatus and process of the present invention. As seen in the Figures, welding flange 40 would provide a neck portion 42 which is substantially of equal diameter pipeline 12, so that welding flange 40 may be welded onto the end portion 13 of pipeline 12 as seen via welding bead 43. Neck portion 42 would lead to flared frustoconical portion 44 which results in an annular flange member 46 haiing an outer wall 48 and a flat exterior mating face 50, the function of which will be described further. As seen in FIG. 4, welding flange 40 would be positioned and welded in place to the end portion 13 of pipeline 12 following the positioning of MACSTOPPLE 18 within the bore 20 of pipeline 12 for ensuring that no gas is leaking from pipeline 12 and any gas venting through apparatus 18 is being vented out away from the apparatus. Therefore, the welding flange 40 would then be welded in place so that a weld bead 43 would be secured around its annular end portion to be properly welded onto the end portion 13 of pipeline 12 and therefore would be securely in place. For purposes of use, it is instrumental that the weld 43 between flange 40 and pipeline 12 be leak proof. Therefore, a plug member (not illustrated) would be placed at the end portion of welding flange 40, so that fluid under pressure could be introduced into the annular space 29 between the expanded bladder 26 of MACSTOPPLE 18. The plug is to assure that the fluid within space 29 is under pressure so that any leaking at annular weld 43 can be detected. Of course, as seen in the Figures, this procedure would take place on both end portions of the pipeline as seen in FIG. 2, so that the process could move forward with both end portions 13 having leak-proof welds between a welding flange 40 and the section of pipe 12 as provided.

Following the positioning of the welding flange 40 on the end portion 13 of both pipe sections 12, as seen in FIG. 2, both MACSTOPPELs 18 are removed. A replacement section of pipe 52, previously welded with a mating flange 56 at each end, which is a standard annular flange having a vent port 82, the function of which will be described further. Also, flange 56 includes a face portion 54 for matingly engaging the face 50 of welding flange 40 in place. The section 52 of pipe is placed in position between the two welding flanges 40, and likewise must be welded in place at this time.

However, following the removal of MACSTOPPLE 18 so that replacement line 52 may be set in place between pipeline end portions 13, the gas contained within pipeline 12 has access to the outside, and therefore welding cannot take place.

Therefore, the welding flange apparatus 40 is provided with a means assuring that any natural gas contained within pipeline section 12 will not have access to the welding procedure that must take place between the flanges 56 and the welding flanges 40 during the welding procedure. This means, is clearly illustrated in FIGS. 4 and 5 and will be discussed further.

As seen in cross-sectional view in FIG. 5, welding flange 40 is provided with an annular channel 60 cut within the mating face 50, for housing a sealing means 51 therewithin. Sealing means 51 would include an annular sacrificial metal sealing ring 64 secured within an annular collar 66, the collar 66 having an outer diameter substantially the width of channel 60. In order to effect a fluid tight seal between annular collar 66 and the wall 62 of channel 60, there would be provided an 0-ring 68, the sealing function of which will be discussed further.

As seen in the Figures, particularly FIG. 5, sealing ring 64 which could be provided with an elastomer seal, would protrude a distance past the outer face 67 of collar 66, and would make any initial contact with face 54 of the adjacent flange 56 along its entire mating face. Further, there is provided a fluid entry port 70 defining a fluid passageway 72 between that portion of channel 60 interior to collar 66 and the outer shoulder portion of flange 40. Therefore, fluid, as indicated by Arrows 74, introduced into port 70 would, under pressure, provide a force necessary to shift annular collar 66 from a position retracted at the rear of channel 60, to a position forward within channel 60 so that metal sealing ring 64 would make sealing contact with the face 54 of adjacent flange 56. 0-ring seal 68 would prevent any leakage of fluid between collar 66 and channel wall 62 within the annular rear portion of channel 60 forward, so that constant pressure could be maintained on collar 66 to maintain metal sealing ring 64 in sealing engagement with the entire annular face 54 of flange 56 and face 50 of welding flange 40.

Therefore, as constant fluid pressure is applied to the rear face 69 of collar 66, gas within pipeline 12 would be precluded from entering the air space exterior to pipeline 12, due to the annular sealing properties of ring 64. Therefore, the flanges 40 and 56 being in adjacent sealing position as seen in FIGS. 5 and 6, would allow a welding bead 80 to be applied around the exterior between flange 40 and flange 56, in total safety for the workers.

Following the placement of welding bead 80 as seen in FIG. 5, it is necessary that the integrity of the weld be tested both through X-rays and hydrostatically. Therefore, for the hydrostatic testing, there is provided transverse fluid port 82 within the shoulder of flange 56, the interior of which is in fluid communication with annular space 84 between annular ring 64 and welding bead 80. Therefore, fluid is pumped into the annular space 84, and if any flow is present in weld 80, the fluid will leak to the exterior 86 of welding bead 80.

In order to properly test with X-rays, it should be noted that both channels 72 and 82 are in a position so that an X-ray line may be positioned at point 90 adjacent the mating flanges, and the ray may extend directly through the flanges (phantom line 92), through bead 80, so that any flaw in bead 80 can be recognized.

Therefore, as stated earlier, FIGS. 2 and 3 would respectively illustrate the lowering of a section of replacement pipeline 52 in position having a pair of flange members 56 on either end of the section of pipeline 52, to matingly engage with each welding flange 40. Each welding flange 40, as illustrated in FIG. 3, would be provided with a fluid line 96, for the introduction of hydraulic fluid into welding flange 40, so that the hydraulic fluid will provide the necessary pressure on collar 66 and sealing ring 64 to effect a fluid tight seal between the welding flange 40 and the adjacent mating flange 56, so that the welding may take place as illustrated by welding unit 100 in FIG. 3.

It is through this process, which includes the welding flange apparatus, which enables the safe welding procedure for replacement of ruptured or worn sections of pipeline, without the necessity of draining the pipeline of accumulated fluids, while assuring the integrity of the welds, and for providing a safe area for the welders to operate during the replacement process.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for replacing a section of a pipeline transporting gas under pressure, the process comprising the following steps:
   (a) removing section of a pipeline, leaving two sections remaining in the pipeline, each remaining section having a first end portion adjacent the section which is removed;
   (b) providing a bypass means for preventing gas in the two remaining sections of the pipeline from flowing to an area adjacent the first end portion of the remaining sections of pipeline;
   (c) engaging a flange member on the first end portion of each remaining section of the pipeline;
   (d) providing a replacement section of pipeline having two ends and including a flange member on each end for engaging the flange members on the first end portions of the remaining sections of pipeline;
   (e) providing sealing means within one flange member adjacent each end of the replacement section of pipeline, each sealing means being movable to a position for sealingly engaging an end surface of a flange member adjacent the sealing means, for preventing any flow of gas between adjacent flange members from within the pipeline to a point exterior the pipeline;
   (f) permanently joining the remaining sections of pipeline with the replacement section while the sealing means sealingly engage adjacent flange members.

2. The process of claim 1, wherein the bypass means includes a "MACSTOPPEL" apparatus positionable within each remaining section of the pipeline.

3. The process of claim 1, wherein each sealing means includes a hydraulically activated sealing ring for sealingly engaging adjacent flange members to prevent fluid leakage therebetween.

4. The process of claim 1, wherein permanently joining of the remaining sections of the pipeline with the replacement section is accomplished with an annular weld around the outer edges of adjacent flange members.

5. The process of 4, further comprising the step of providing a fluid passageway in at least one flange member adjacent each end of the replacement section for injecting fluid between the sealing member and the weld to detect any flaw in the weld through leakage of fluid therethrough.

6. A welding flange apparatus, positionable on an end portion of a section of pipeline, and for engaging a flange of an adjoining section of pipeline, the apparatus comprising:
   (a) a flange member;
   (b) a annular channel adjacent a first end of the flange member;
   (c) a sealing member housed within the channel, and removable to a position sealingy engaged against an end surface of an adjacent flange member; and
   (d) means for exerting pressure on the sealing member for moving the sealing member to sealing engagement against the end surface of the adjacent flange member to provide a gas-tight seal between the flange member and the adjacent flange member.

7. The welding flange apparatus of claim 6, wherein the means for exerting pressure on the sealing member includes a port for allowing injection of fluid to a side of the sealing member opposite the first end of the flange member for moving the sealing member to the sealing position.

8. The apparatus of claim 6, wherein the sealing member is maintained in sealing engagement against the end surface of the adjacent flange member by continuous hydraulic pressure.

9. The apparatus of claim 6, further comprising means for providing a permanent weld between the flange member and the adjacent flange member for permanently engaging the flange members to one another.

10. The apparatus of claim 9, further comprising means for testing the integrity of the weld.

11. A process for replacing a section of a gas pipeline comprising the steps of:
    (a) removing a section of a pipeline, leaving two sections remaining in the pipeline, each remaining section having a first end portion adjacent the section which is removed;
    (b) providing a bypass means for preventing gas in the two remaining sections of the pipeline from flowing to an area adjacent the first end portion of the remaining sections of pipeline;
    (c) welding a flange on the first end portions of each of the remaining sections of pipeline;
    (d) providing a replacement section of pipeline having tow ends including a flange member on each end for engaging the flange members on the first portions of the remaining sections of pipeline, the length of the replacement section being such that the flange members of the replacement section and the flange members of the remaining sections of pipeline are adjacent one another upon positioning of the replacement section in line with the remaining sections of the pipeline;
    (e) providing sealing means within one flange member adjacent each end of the replacement section of pipeline, each sealing means being movable to a position for sealingly engaging a surface of a flange member adjacent the sealing means;
    (f) exerting fluid pressure on the sealing means, causing the sealing means to shift into sealing engagement against a surface of an adjacent flange member for preventing any flow of gas between adjacent flange members from within the pipeline to a point exterior the pipeline; and
    (g) welding the outer faces of adjacent flange members while exerting continuous fluid pressure on the sealing means, so that gas is precluded from entering an area adjacent the weld.

12. The process of 11, wherein the bypass means are positionable within the remaining sections of pipeline adjacent the first ends of the remaining section, and are removed from the remaining sections of the pipeline prior to positioning of the replacement section in the pipeline.

13. The process of claim 11, wherein the bypass means serves to allow fluid to flow from the remaining sections of the pipeline to a point a distance from the first end portions of the remaining sections of pipeline.

* * * * *